(12) United States Patent
Nolin et al.

(10) Patent No.: US 10,251,506 B1
(45) Date of Patent: Apr. 9, 2019

(54) APPARATUS AND METHOD FOR STEAMING AND SLICING EGGS

(71) Applicants: Ronald P. Nolin, Palmetto, FL (US); David E. Roche, Nashua, NH (US)

(72) Inventors: Ronald P. Nolin, Palmetto, FL (US); David E. Roche, Nashua, NH (US)

( * ) Notice: Subject to any disclaimer, the term of this patent is extended or adjusted under 35 U.S.C. 154(b) by 0 days.

(21) Appl. No.: 15/964,071

(22) Filed: Apr. 27, 2018

Related U.S. Application Data

(60) Provisional application No. 62/599,673, filed on Dec. 15, 2017.

(51) Int. Cl.
| | |
|---|---|
| *A23L 5/10* | (2016.01) |
| *A47G 19/28* | (2006.01) |
| *A47J 29/02* | (2006.01) |
| *A47J 29/06* | (2006.01) |
| *B26B 29/06* | (2006.01) |

(52) U.S. Cl.
CPC ............. *A47J 29/06* (2013.01); *A23L 5/13* (2016.08); *A47G 19/28* (2013.01); *A47J 29/02* (2013.01); *B26B 29/063* (2013.01); *A23V 2002/00* (2013.01)

(58) Field of Classification Search
CPC ..... A23L 5/13; B26B 29/063; A23V 2002/00; A47J 29/06; A47J 29/02; A47J 29/04; A47J 29/00; A47J 47/00; A47J 47/02; A47J 43/20; A47B 31/02; A47B 2031/026; A47F 7/0028; A47F 7/0071; A47G 19/28; A47G 19/285; A47G 2400/06; A47G 2400/08; B65D 85/32

USPC ............. 211/126.1, 14, 85.4; 220/508; 206/521.1, 557, 562, 563; 99/440; D7/503, 550.1, 553.1, 552.2, 553.6, D7/553.7, 554.2, 554.4, 701, 707, 611, D7/355
See application file for complete search history.

(56) References Cited

U.S. PATENT DOCUMENTS

| | | | | |
|---|---|---|---|---|
| 186,901 | A * | 1/1877 | Townsend et al. | A47J 29/06 294/26.5 |
| 451,166 | A * | 4/1891 | Bryant | A47J 29/06 99/440 |
| 620,044 | A * | 2/1899 | Marks | A47J 29/06 99/440 |
| 1,070,476 | A * | 8/1913 | Hunholz | B28B 7/241 249/119 |

(Continued)

*Primary Examiner* — Jennifer E. Novosad
(74) *Attorney, Agent, or Firm* — Dorothy S. Morse

(57) ABSTRACT

An apparatus used in a cooking pot and holding up to thirteen small-to-large chicken eggs for the purpose of steaming the eggs until cooked. The apparatus has a bottom surface with six lower egg supports and one center egg support. Six additional upper egg supports are located radially and alternatingly between six perimeter wall sections. The bottom surface is elevated on legs that allow a small volume of water to be placed under it and heated to steam the eggs. The perimeter walls extend upwardly from the bottom surface above eggs seated on the lower egg supports, each wall section having a beginning slicing guide slot aligned with the centers of seated eggs. Finishing slicing guide slots also extend through the center egg support and each of the lower egg supports to allow a slicing device inserted into the vertically-extending slicing guide slots to cut peeled eggs in half.

20 Claims, 5 Drawing Sheets

(56) References Cited

U.S. PATENT DOCUMENTS

| | | | | |
|---|---|---|---|---|
| 1,184,811 | A * | 5/1916 | Berger | A47J 29/06 99/440 |
| 1,250,888 | A * | 12/1917 | Johnson | A63B 71/0045 211/14 |
| 1,548,242 | A * | 8/1925 | Anderson | A47J 29/06 99/440 |
| 1,695,832 | A * | 12/1928 | Weber | A47J 29/04 99/342 |
| 1,736,122 | A * | 11/1929 | La Duke | A47J 29/06 126/390.1 |
| 1,810,258 | A * | 6/1931 | Sperber | A47J 29/06 211/128.1 |
| 2,402,883 | A * | 6/1946 | Gavalis | A47J 29/06 211/14 |
| 2,699,719 | A * | 1/1955 | Zelante | A47J 29/04 185/38 |
| 2,807,701 | A * | 9/1957 | Conlin | A47J 29/06 126/20 |
| 4,276,820 | A | 7/1981 | Joannou | |
| 5,063,071 | A | 11/1991 | Bergmeier | |
| D346,931 | S * | 5/1994 | Collins | D7/357 |
| 5,662,027 | A * | 9/1997 | Neville | A47J 29/06 99/403 |
| 5,934,185 | A * | 8/1999 | Sonnier | A47J 36/20 211/181.1 |
| 6,038,966 | A * | 3/2000 | Spence | A47J 29/00 99/336 |
| 6,053,335 | A * | 4/2000 | Rutter | A47G 19/28 211/14 |
| D569,679 | S * | 5/2008 | Lion | D7/357 |
| 8,245,632 | B1 * | 8/2012 | Fields | A47J 29/02 99/440 |
| 2008/0206437 | A1 * | 8/2008 | Perry | A47J 27/04 426/614 |
| 2015/0351410 | A1 * | 12/2015 | Galbincea | A47J 29/06 220/573.1 |
| 2016/0128504 | A1 * | 5/2016 | Rosland | A47J 29/06 99/440 |
| 2018/0249856 | A1 * | 9/2018 | Samartgis | A47J 36/027 |

* cited by examiner

APPARATUS AND METHOD FOR STEAMING AND SLICING EGGS

CROSS-REFERENCES TO RELATED APPLICATIONS

This patent application relates in subject matter to U.S. provisional patent application 62/599,673, having the title of APPARATUS AND METHOD FOR STEAMING AND SLICING EGGS, which was filed on Dec. 15, 2017, by the same applicants/inventors herein. As a result of the overlapping subject matter involved, the applicants/inventors herein respectfully request that domestic priority be granted for their currently filed and now pending U.S. utility patent application herein based upon their earlier-filed U.S. provisional patent application 62/599,673.

BACKGROUND OF THE INVENTION

Field of the Invention

The invention relates to devices and methods used for cooking eggs in their shell so that they can be easily peeled after cooking, each egg shell can be removed while leaving a smooth exposed exterior surface on the hard-cooked egg white, all hard-cooked eggs can be easily and uniformly sliced in half for enhanced food presentation and handling purposes, and when the hard-cooked yolks are removed from the cooked whites a fillable recess remains in each sliced egg white half, more particularly to devices and methods typically used for steaming one to thirteen small-to-large chicken eggs (or eggs of equivalent size).

The egg steaming and slicing guide apparatus of the present invention preferably holds up to thirteen (small-to-large size) chicken eggs at a time while they are steamed, and is preferably about 6.25-inches in diameter and about 3.5-inches in height dimension, but not limited thereto, fitting into a covered cooking pot with a domed cover having minimum dimensions that include a 7-inch inside diameter (ID) and a 4.5-inch height. It is also not self-powered, has no moving parts, is made from materials that do not prematurely degrade when exposed to steam cooking temperatures, and in addition is made from materials compliant with U.S. food industry standards, including but not limited to silicone rubber. Furthermore, the present invention apparatus includes structural elements that while holding cooked eggs (small-to-large size chicken eggs, or eggs equivalent in size thereto) in a vertical orientation, allows easy, efficient, prompt, and well turned-out slicing of one-to-three hard-cooked eggs at a time, each into two substantially equal-sized halves. Contemplated applications include use by restaurants, catering operations, and homeowners for enhanced salad and/or food plating accent/decoration involving sliced hard-cooked eggs, as well as when a served food product requires hard-cooked egg whites as a receptacle for an egg yolk mixture or other filling, and for such use a smooth egg white exterior surface is desirable for enhanced food presentation purposes.

Description of the Related Art

The prior art thought to be most similar to the present invention are the inventions disclosed in U.S. Pat. No. 4,276,820 to Joannou (Jul. 7, 1981) and U.S. Pat. No. 5,063,071 to Bergmeier (Nov. 5, 1991). During use of the Joannou automatic egg cooking invention, one egg is placed into an oscillatory system that constantly tests the magnitude and duration of oscillations in that egg, and then rings an alarm when desired egg consistency is reached. Other eggs cooked concurrently with the tested egg are not oscillated. In contrast, during use of the present invention, no egg testing is conducted via oscillation or any other method, no alarm is included as a part of present invention structure, and the present invention has no moving parts. Furthermore, during use of the Bergmeier method for centering egg yolks in hard boiled eggs, wherein during their cooking and while the egg white solidifies, vertically-positioned eggs are continuously rotated in opposite directions about their longitudinal axis. The rotation is at high speed, and for short intervals in each direction. As a result, during egg white solidification the high speed back-and-forth rotation causes the egg yolk to migrate into the center of the egg, resulting in a uniform layer of hardened egg white around the yolk of the cooked egg. In contrast to the Bergmeier method, the present invention method requires no moving parts. No prior art is currently known to teach the present invention apparatus and method, or provide motivation to teach the present invention alone or in combination with one or more additional prior art references.

SUMMARY OF THE INVENTION

The primary objective of this invention is to provide an apparatus and method used for hard-cooking eggs in their shell so that they can be easily peeled after cooking, each egg shell can be removed while leaving a smooth exposed exterior surface on the hard-cooked egg white, all cooked eggs can be easily and uniformly sliced in half (one-to-three at a time) for enhanced food presentation and handling purposes, and when the hard-cooked yolks are removed from the cooked whites, a fillable recess remains in each sliced egg white half. It is a further object of this invention for its most preferred embodiment to be sized for small-to-large chicken eggs (or eggs equivalent in size thereto), and cooking in a pot with a domed cover/lid commonly available for use in United States household and commercial kitchens, although size adaptation for other types of eggs and cooking pots remains within the contemplated scope of the present invention. A further object of this invention is to provide an egg steaming and slicing guide apparatus that has no moving parts. It is also an objective of this invention to provide an egg steaming and slicing apparatus that holds up to thirteen small-to-large chicken eggs at a time while they are steamed and fits into a covered cooking pot with a domed cover/lid having minimum dimensions of a 7-inch inside diameter (ID) and a 4.5-inch height. In addition, it is an objective of this invention to provide an egg steaming and slicing apparatus that is made from waterproof and non-toxic material, preferably silicone rubber, but not limited thereto. A further object of this invention is to provide an egg steaming and slicing apparatus that is made from materials that do not prematurely degrade when exposed to steam cooking temperatures and are compliant with U.S. food industry standards.

The most preferred embodiment of the present invention is preferably about 6.25-inches in diameter and has an approximately 3.5-inch height dimension, but is not limited thereto. Its most preferred embodiment also has thirteen egg supporting features used for hard-cooking eggs (small-to-large size chicken eggs, or equivalent) in their shell via circulating steam created by a small amount of boiling water in the bottom of the cooking pot. The present invention method used for cooking eggs and cooling them after steaming, allows them to be easily peeled. The most preferred embodiment of the present invention can hold up to thirteen small-to-large chicken eggs at a time while they are steamed and will fit into a cooking pot with a domed cover/lid having minimum dimensions of a 7-inch inside diameter (ID) and a 4.5-inch height. Whether one or thirteen eggs are cooked at a time via the present invention, the steaming time for achieving a hard-cooked egg consistency of egg yolk and egg white remains the same. The present invention is also not self-powered, has no moving parts, and is made from materials that do not prematurely degrade when exposed to steam cooking temperatures and are otherwise compliant with U.S. food industry standards. The present invention also includes structural elements that while used as seats/supports for egg cooking, will also each hold an egg (after cooking and shell removal) in a vertical orientation to allow easy, efficient, and well turned-out slicing of at least one-to-three hard-cooked eggs at a time, each into two substantially equal-sized halves. Contemplated applications of the present invention include use by restaurants, catering operations, and homeowners for salad and/or food plating accent/decoration involving sliced hard-cooked eggs, as well as where food presentation requires hard-cooked egg whites as a receptacle for a seasoned egg yolk mixture or other filling, and a smooth egg white surface is desirable for enhancing the food presentation.

COMPONENT LIST

Figure 1:
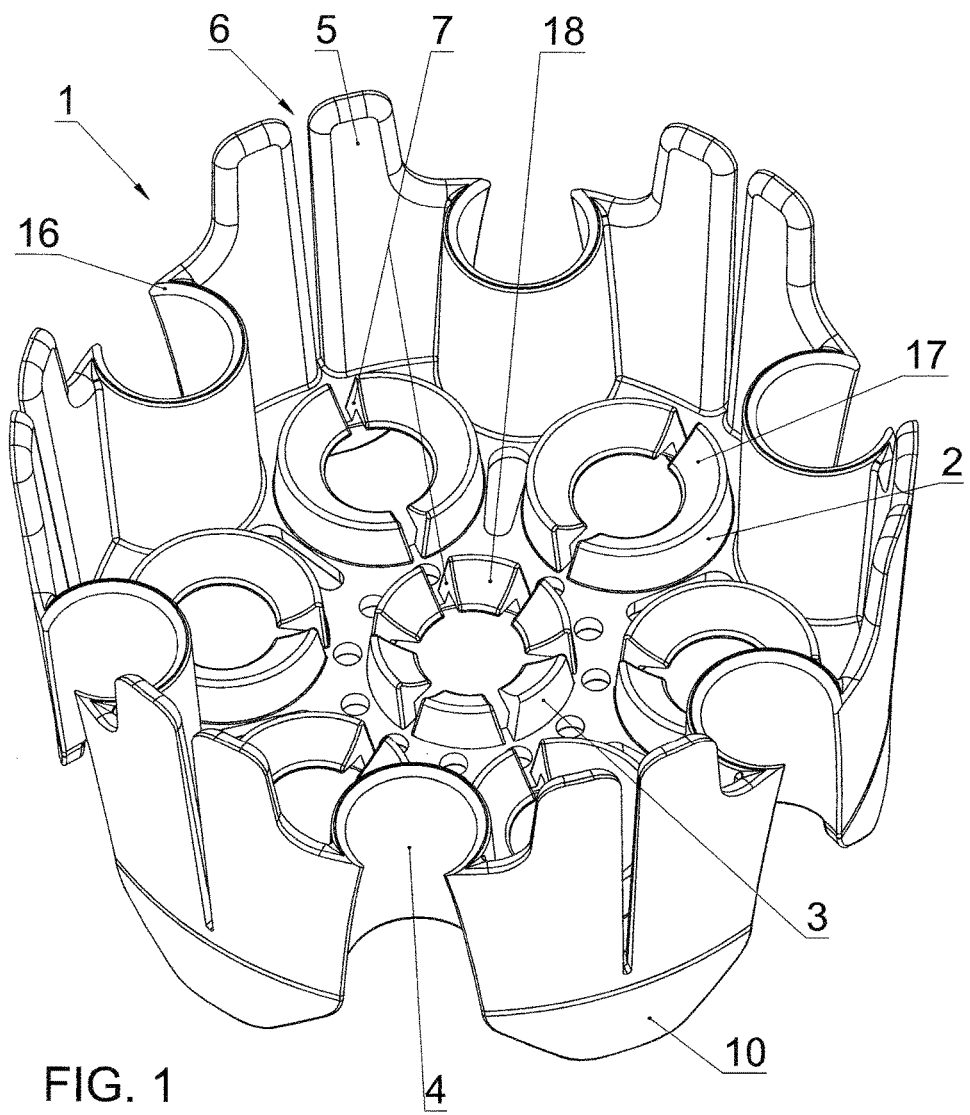
FIG. 1 is a perspective view from the top of the most preferred embodiment of the present invention egg steaming and slicing guide apparatus showing egg supports for positioning a maximum of thirteen eggs during steaming, each having an arcuate egg seat on its top end, six spaced-apart upper egg supports each with a substantially semi-circular cross-section, six spaced-apart and substantially circular lower egg supports, and one additional and substantially circular lower egg support centered on the interior bottom surface of the apparatus (hereinafter referred to as 'center egg support'), FIG. 1 also showing opposed egg slicing guide slots through the lower egg supports (they each have two radially-aligned finishing slicing guide slots) and the center egg support (it has six finishing slicing guide slots that are aligned radially from the center of the apparatus), each finishing slicing guide slot in the six lower supports also aligned with two of the beginning slicing guide slots in the apparatus' perimeter wall, and the center egg support having pairs of its finishing slicing guide slots aligned with the opposed finishing slicing guide slots in each of the six lower egg supports surrounding it, and FIG. 1 further showing steam vent holes and slots through the bottom surface of the apparatus between and adjacent to the lower egg supports and the center egg support, all of which are marked with numerical identification in FIG. 2.

1—Most Preferred Embodiment of the Invention (preferably made as a one-piece unit utilizing molded construction, and also referred to herein as apparatus 1)
2—Lower Egg Support (six are preferably included, each having a substantially circular configuration with two opposed and aligned Finishing Slicing Guide Slots 7 (designated hereinafter also as "one pair") that from a top perspective view are shown to separate the elevated portion of Lower Egg Support 2 above Bottom Surface 11 into two halves, each half comprising an Arcuate Egg Seat 17
3—Center Egg Support (one is preferred, although optional, and has the same substantially circular configuration and elevated positioning relative to Bottom Surface 11 that is found in Lower Egg Supports 2, except that six (three pairs of opposed and aligned) Finishing Slicing Guide Slots 7 are present, and each of the six portions of the Center Egg Support 3 between The six Finishing Slicing Guide Slots 7 of Center Egg Support 3 collectively form the Arcuate Egg Seat 18)
4—Upper Egg Support (six are preferably included, each having a substantially semi-circular cross-section, an Arcuate Egg Seat 16, and inward positioning toward the center of apparatus 1 from its connection to and between two different sections of Perimeter Wall 5 so that its hollow interior surface becomes part of the exterior perimeter surface of apparatus 1 collectively with exterior surfaces of the six sections of Perimeter Wall 5)
5—Perimeter Wall (includes six distinct sections that each form the opposed slicing guide wings (no independent number assigned) used during egg 14 slicing that are present on both sides of each of the six Beginning Slicing Guide Slots 6, the six distinct sections of Perimeter Wall 5 are also each positioned between, and depend from a different pair of adjacent Upper Egg Supports 4)

6—Beginning Slicing Guide Slot (six are shown, each centered and vertically-extending in a different one of the six sections of Perimeter Wall 5)

7—Finishing Slicing Guide Slot (two radially aligned with one another in each Lower Egg Support 2 and six radially aligned in pairs in Center Egg Support 3, and each Finishing Slicing Guide Slot 7 vertically-extending and in radial alignment with two opposed Beginning Slicing Guide Slots 6)

8—Steam Vent Slot (through Bottom Surface 11 and assisting circulation of steam 15 above and below Bottom Surface 11)

9—Steam Vent Hole (through Bottom Surface 11 and assisting circulation of steam 15 above and below Bottom Surface 11)

10—Leg (six are preferably included, each descending downwardly from a different one of the six sections shown in Perimeter wall 5)

11—Bottom Surface (Lower Egg Supports 2, Center Egg Support 3, Steam Vent Holes 9, and Steam Vent Slots 8 are integral to Bottom Surface 11)

12—Cooking Pot

13—Domed Cover/Lid (creates space above Cooking Pot 12 for steam collection and circulation)

14—Egg

Figure 5:
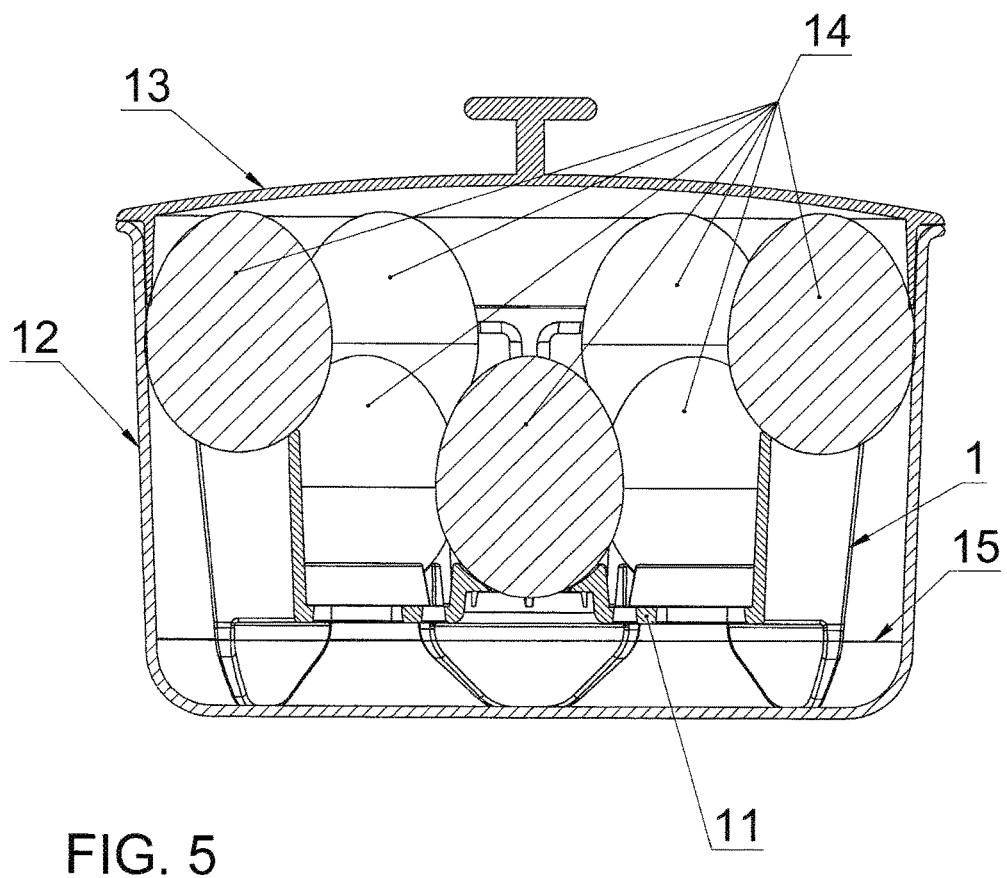
FIG. 5 is a section view of the apparatus in FIGS. 1-4 positioned within a cooking pot, a domed cover/lid on the cooking pot configured and in a position to capture and assist the circulation of steam throughout the cooking pot during egg cooking, four eggs each vertically positioned on a different upper egg support (small end up), two eggs each independently and vertically positioned on a different lower egg support (small end up), one egg vertically positioned on the center egg support (small end up), and a horizontally-extending broken line across the legs of the apparatus, indicating typical positioning of the top surface of water in the Cooking Pot (below the apparatus' Bottom Surface 11) for egg steaming purposes.

15—Water (for simplicity of illustration the water and its steam/vapor state are not shown in the accompanying illustrations, except by the number 15 in FIG. 5 and the arrow extending from it toward the top water level in cooking pot 12, however, since the steam/vapor is derived from water 15, the number 15 is also selectively employed in the text in association with the word 'steam')

16—Arcuate Egg Seat in Upper Egg Supports 4

17—Arcuate Egg Seat in Lower Egg Supports 2

18—Arcuate Egg Seat in Center Egg Support 3

DETAILED DESCRIPTION OF THE INVENTION

The present invention is preferably a molded apparatus 1 used for cooking up to thirteen small-to-large size chicken eggs 14 (or other eggs of equivalent size) in their shell in approximately thirteen minutes, and so that after cooking and cooling they are easily peeled, and leave a substantially unblemished exterior surface on the hard-cooked egg white. The most preferred embodiment of the present invention apparatus 1 fits into a cooking pot 12 (having a minimum inside diameter (ID) of 7-inches and a minimum height dimension of 4.5-inches) with a domed lid 13, and holds the eggs 14 in a vertical orientation (typically small end up) while they are steamed, using only about 1.5 cups of water 15. Water 15 is not pre-heated, and instead is heated to produce the steam 15 needed to cook eggs 14 only after all eggs 14 in need of cooking (up to thirteen) are supported upon one of the egg seats (17, 18, and 16) respectively in egg supports (2, 3, or 4). Contemplated applications of the present invention apparatus 1 include residential use by those seeking fast and reproducible cooking times for simple/reliable production of fully cooked hard-cooked eggs 14, as well as their expedited peeling and slicing. Contemplated applications of apparatus 1 also include restaurant, catering, and residential application for salad and/or food plating accent/decoration involving sliced hard-cooked eggs 14, and/or where food presentation needs to include hard-cooked egg whites as a receptacle for deviled egg yolk (or other) filling/mixture, and a smooth unblemished egg white exterior surface is desirable for enhancing the food presentation.

The most preferred embodiment of the present invention apparatus 1 is not self-powered, has no moving parts, is made from elastomer materials that do not prematurely degrade when exposed to steam cooking temperatures, and is also made from materials that are compliant with U.S. food industry standards. Preferred embodiments of present invention apparatus 1 also include structural elements that are used during egg 14 steaming, and later assist in the slicing of peeled hard-cooked eggs 14 that are placed in a vertical orientation (typically small end up) upon one of the lower/center egg supports (2, 3). The present invention apparatus 1 also allows easy, efficient, and well turned-out slicing of at least one-to-three hard-cooked eggs 14 at a time, each into two substantially equal-sized halves.

Advantages of the present invention apparatus 1 include reducing the amount of water to fully cook eggs 14, facilitating the easy peeling of eggs 14 by steaming them, and increasing the speed and efficiency of slicing eggs 14 in half, since at least three hard-cooked eggs 14 at a time can be sliced. Furthermore, whether apparatus 1 is used in residential or commercial applications, in addition to its time-saving benefit in food preparation, apparatus 1 concurrently provides the ability to enhance the attractiveness of served foods (and buffet/catered food trays) containing hard-cooked eggs 14 that are sliced and/or hard-cooked egg whites that are included as a receptacle for a filling/mixture.

FIG. 1 is a perspective view from the top of the most preferred embodiment of the present invention egg steaming and slicing apparatus 1 showing supports (2, 3, and 4) for positioning up to thirteen eggs 14 during steaming, six spaced-apart upper egg supports 4, six spaced-apart lower egg supports 2, and one additional lower egg support 3 centered on the interior bottom surface 11 (numerically marked in FIG. 2) of apparatus 1 (and referred to herein elsewhere as center egg support 3). The positioning of egg supports (2, 3, 4) in apparatus 1 is such that good finger access to all eggs 14 supported by apparatus 1 is allowed. FIG. 1 also shows two opposed finishing slicing guide slots 7 through each of the six lower egg supports 2 with all finishing slicing guide slots 7 aligned radially from the center of apparatus 1 and further aligned with two opposed beginning slicing guide slots 6. In contrast, center egg support 3 has six spaced-apart finishing slicing guide slots 7, each of which is positioned adjacent to a different lower egg support 2 and aligned radially with the pair of opposed finishing slicing guide slots 7 in that lower egg support 2 and the opposed finishing slicing guide slots 7 in lower egg support 2 remote from the adjacent lower egg support 2, also aligned radially with the opposing finishing slicing guide slot 7 in center egg support 3, and further r aligned radially with the two opposed perimeter beginning slicing guide slots 6 adjacent to that pair of opposed lower egg supports 2. Toward the perimeter of present invention egg steaming and slicing guide apparatus 1, FIG. 1 also shows the six upper egg supports 4 positioned so that an egg 14 placed upon each one becomes generally centered between two adjacent beginning slicing guide slots 6. Each upper egg support 4 has a semi-circular cross section and is shown in FIG. 1 as an open/hollow tapered cone curving inwardly toward the center of apparatus 1, thus leaving the hollow interior surface of each upper egg support 4 functioning as part of the exterior perimeter surface of apparatus 1 in combination with the exterior surfaces of the six sections of perimeter wall 5. In addition, FIG. 1 shows a stabilizing/elevating leg

10 below each beginning slicing guide slot 6, and several steam vent slots 8 and steam vent holes 9 (numerically marked in FIG. 2) allowing steam generated from water 15 (numerically marked in FIG. 5) that is below the bottom surface 11 (numerically marked in FIG. 2) of apparatus 1 to circulate faster and more thoroughly/pervasively around the eggs 14 (numerically marked in FIG. 5) located on upper/lower egg seats (16, 17, and 18) to cook eggs 14 faster and more thoroughly than would otherwise be achieved without steam vent slots 8 and steam vent holes 9. Typically, although it is preferred for lower egg supports 2, 3, and 4 to have a circular configuration and radially-extending finishing slicing guide slots 7, other variations in apparatus 1 are also contemplated to be within the scope of the present invention, such as but not limited to differences in the minimum and maximum height dimensions of lower/center egg seats 17 and 18, the height/configuration/positioning of the concave curvature of lower egg seats 17 and 18, the shape/size/number/positioning of steam vent slots 8 and steam vent holes 9, and the upper and lower perimeter wall 5 configurations of apparatus 1 respectively above, adjacent to, and below beginning slicing guide slots 6. Although not marked by a component number in FIG. 1, a chamfered inside top edge is visible on the six sections of perimeter wall 5, which is preferred but not critical.

Figure 2:
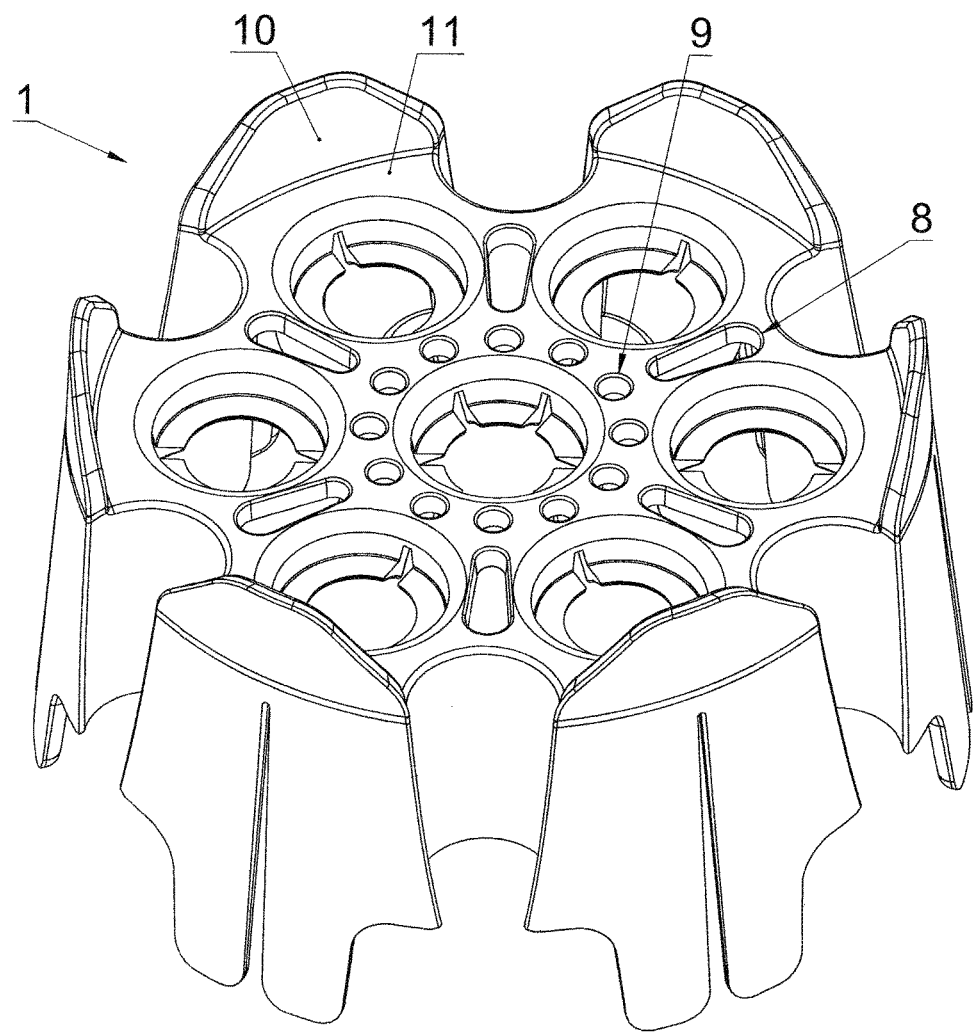
FIG. 2 is a perspective view from the bottom of the apparatus in FIG. 1 showing six spaced apart feet/legs (hereinafter 'leg' without any intent of limitation), each leg providing part of the lower perimeter of the apparatus and descending downwardly from a different section of the perimeter wall when the present invention apparatus has upright positioning, FIG. 2 also showing the legs each situated below a different one of the beginning slicing guide slots when the present invention has upright positioning, and FIG. 2 further showing twelve steam vent holes and six steam vent slots through the bottom surface of the apparatus, a different steam vent slot positioned between each pair of adjacent lower egg supports and the twelve steam vent holes surrounding the central egg support.
Figure 3:
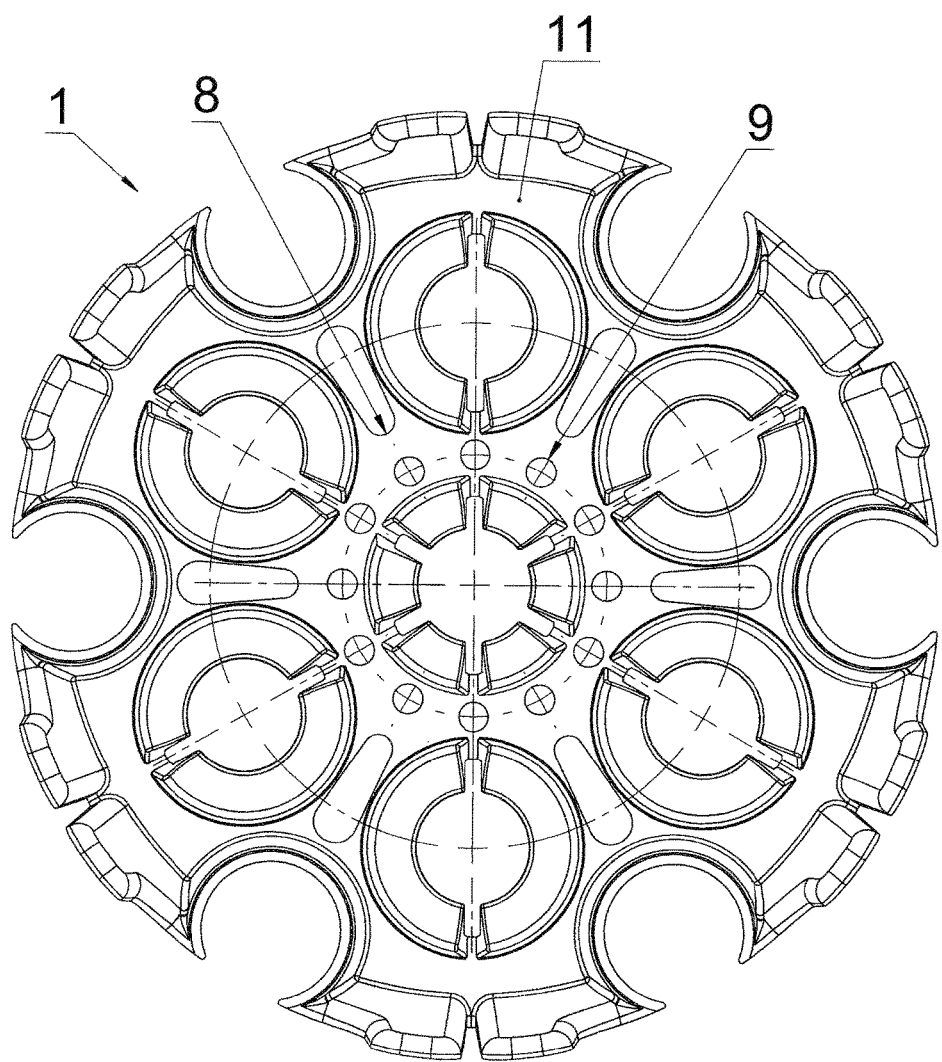
FIG. 3 is a top view of the apparatus in FIGS. 1 and 2 with broken lines showing preferred radial alignment of the steam vent slots and finishing slicing guide slots.

FIG. 2 is a perspective view from the bottom of the apparatus 1 in FIG. 1 showing six spaced apart legs 10, each positioned below a different one of the six sections of perimeter wall 5 and under that section's beginning slicing guide slot 6 when apparatus 1 has upright positioning. FIG. 2 also shows twelve steam vent holes 9 and six steam vent slots 8 through the bottom surface 11 of apparatus 1, a different steam vent slot 8 positioned between each pair of adjacent lower egg supports 2 and the twelve steam vent holes 9 forming a circle around center egg support 3. In various preferred embodiments of the present invention apparatus 1, the shape, size, number, and positioning of steam vent slots 8 and steam vent holes 9 through bottom surface 11 may vary from that shown in FIG. 2, as long as they remain able to fulfill their intended function of steam 15 circulation enhancement and distribution within cooking pot 12 without sacrificing the strength and stability of bottom surface 11 and egg supports 2, 3, and 4. Although not marked by a component number in FIG. 2, a chamfered inside bottom edge is visible on the six legs 10 descending downwardly from the six sections of perimeter wall 5, when apparatus 1 has upright positioning. Although such chamfered configuration is preferred, and may be different from that shown, it is not critical. FIG. 3 is a top view of the apparatus 1 in FIGS. 1 and 2 with broken lines showing radial alignment of each steam vent slot 8 with an opposed steam vent slot 8 on the opposite side of center egg support 3, two upper egg supports 4, and two of the steam vent holes 9 surrounding center egg support 3. Broken lines in FIG. 3 also show the preferred radial alignment of remaining opposed pairs of steam vent holes 9 (that are not radially aligned with steam vent slots 8) with two opposed beginning slicing guide slots 6 in two opposed sections of perimeter wall 5 (see FIG. 1), the finishing slicing guide slots 7 in two aligned lower egg supports 2 and two of the opposed finishing slicing guide slots 7 in center egg support 3. Additional broken lines in FIG. 3 show an equidistant positioning of all steam vent slots 8 from center egg support 3, and an equidistant positioning of all lower egg supports 2 from center egg support 3, and although such positioning and alignment is preferred, it is not considered critical to the present invention as long as steam 15 circulation around apparatus 1 and eggs 14 is adequate to support present invention objectives. In addition, the shape, size, number, and positioning of steam vent slots 8 and steam vent holes 9 through bottom surface 11 are not critical and it is not intended for their structure in apparatus 1 to be limited to the shapes, sizes, number, and positioning shown in FIG. 3. Also as shown in FIG. 3, one can see that each of the egg supports 2, 4, and 4 have the tapered perimeter configuration of a cone (best observed in upper egg supports 4 due to their greater height dimension). The tapered configuration visible does not significantly contribute to steam 15 circulation around eggs 14 and is not considered critical to present invention function, although it may assist in its manufacture. Furthermore, FIG. 3 shows a small unnumbered surface adjacent to the top/outside edge of each arcuate egg seat (16, 17, and 18). Although such surface (if present) may assist in the manufacture of apparatus 1 and it could be smaller or larger than is shown in FIG. 3, that feature was not given numerical identification as it is not considered critical to present invention function.

Figure 4:
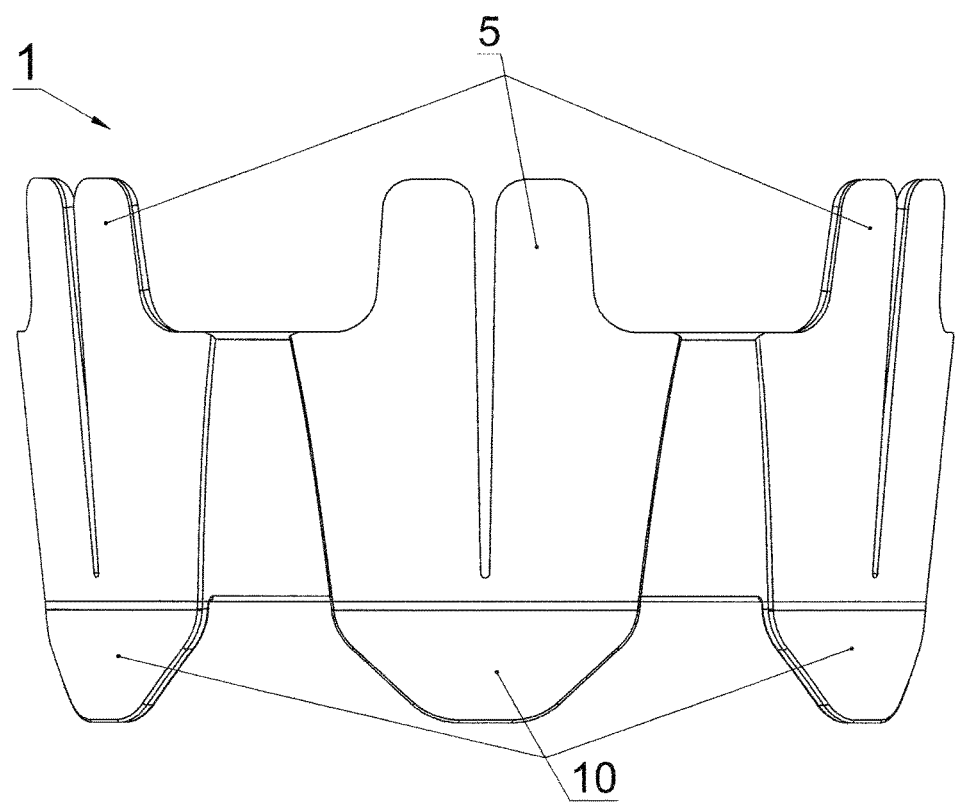
FIG. 4 is a side view of the apparatus in FIGS. 1-3 showing several vertically-extending beginning slicing guide slots, a different beginning slicing guide slot (marked with numerical identification in FIG. 1) substantially centered in each one of the six sections of the perimeter wall (three sections visible in FIG. 4 and three sections hidden from view behind the visible sections), and a different leg also downwardly depending from each section of the perimeter wall.

FIG. 4 is a side view of the apparatus 1 in FIGS. 1-3 in an upright position and showing several vertically-extending beginning slicing guide slots 6 that narrow top-to-bottom (not critical), a different slot 6 substantially centered in each of the six sections of the perimeter wall 5, and a different leg 10 also downwardly descending from the lower end of each of the six sections of perimeter wall 5 (three of which are shown in FIG. 4). Also, while the shape of each section of perimeter wall 5 and legs 10 shown in FIG. 4 is preferred, it is not critical. It is also considered to be within the scope of the present invention for the number of sections of perimeter wall 5 and/or the number of legs 10 used to be different from that disclosed for the most preferred embodiment of the present invention apparatus 1 identified herein as long as the stated objectives of apparatus 1 are still met. Furthermore, on each side of each beginning slicing guide slot 6, the adjacent portions of perimeter wall 5 in each of its six sections form opposed slicing guide wing areas used during egg 14 slicing to stabilize and guide a slicing tool so that a neat, efficient, and presentable cutting of one to three hard-cooked eggs at a time can be achieved. The opposed slicing guide wing areas of perimeter wall 5 on each side of each beginning slicing guide slot 6, are each connected to a different upper egg support 4, help to strengthen and stabilize the adjacent upper egg seats/supports 16/4 to which they are connected, thus stabilizing the eggs 14 seated upon each upper egg support 4 during egg 14 steaming. Furthermore, the appearance of the top ends of perimeter wall 5 and the bottom ends of legs 10 shown in FIG. 4 is not critical, and the perimeter/edge configuration, width dimension, and height dimension thereof in various preferred embodiments of the present invention may be different than that shown in FIG. 4. FIG. 5 is a section view of the apparatus 1 in FIGS. 1-4 positioned within a cooking pot 12, a domed cover/lid 13 on cooking pot 12 providing a circulation area for steam 15 above seven eggs 14 (three shown in sectioned view), with four of the eggs 14 in FIG. 5 vertically-extending (small end up) on upper egg supports 4, two of the eggs 14 in FIG. 5 vertically-extending eggs 14 (small end up) on lower egg supports 2, and one vertically-extending egg 14 (also small end up) on the center egg support 3, and a horizontally-extending line across the legs 10 of apparatus 1 indicating approximate positioning of the top surface of water 15 in a cooking pot 12 (under the bottom surface 11 of apparatus 1), which may have a depth dimension of about 0.75-inches, but is not limited thereto. FIG. 5 also shows the legs 10 of apparatus 1 in water 15, raising the bottom surface 11 of apparatus 1 above water 15 so that eggs 14 supported by apparatus 1 become steamed (not boiled) during cooking. The domed cover/lid 13 shown in FIG. 5 seals the open top end of cooking pot 12 to collect steam 15 and maintain its circulation and distribution within cooking pot 12 for accelerated cooking of eggs 14 to the consistency of a hard-cooked egg (when a hard-cooked state is needed). Although the thickness and type of materials selected for manufacture of apparatus 1 may vary from that shown in FIGS. 1-5, thickness selection made will ensure sturdy support of eggs 14 and long-term repeat use of apparatus 1 at the elevated temperatures needed for fully steaming eggs 14 to a hard-cooked state.

The most preferred method of using the present invention apparatus 1 for steaming eggs 14 involves the following steps. First add approximately 1.5 cups of water 15 to cooking pot 12. Add apparatus 1 to pot 12 so that legs 10 are in contact with the bottom interior surface of cooking pot 12. Place up to thirteen eggs 14 on the available egg seats 17, 18, or 16 respectively a part of the upper portions of supports (2, 3, and 4) with their small ends up. Place cooking pot 12 onto smallest burner of electric stove (not shown). Center apparatus 1 so that no eggs 14 touch the inside of cooking pot 12 (preferred, but not critical). Place a domed cover/lid 13 on the cooking pot 12 that seals cooking pot 12 to capture and circulate steam 15 around the eggs 14 that are present in cooking pot 12 and supported on seats 17, 18, and/or 16. Set the temperature of the stove (or other) heating element on high for seven minutes, and then turn the heating element's temperature setting down to the lowest temperature setting that still allows the water 15 in cooking pot 12 to steam and then continue the heating for six minutes, or a total time of thirteen minutes. Shut off the heating element and allow cooking pot 12, apparatus 1, and eggs 14 to remain on the stove heating element until the water 15 stops boiling. Thereafter, remove cooking pot 12 from the heating element and carry it to a sink (not shown). Remove the hot domed cover/lid 13 and fill the cooking pot 12 with a first quantity of cold water 15 (not shown). Replace domed cover/lid 13 and pour out the first quantity of water 15 and refill the cooking pot 12 once again with additional cold water 15 (not shown). The steamed eggs 14 should now be cool enough for peeling. Remove the eggs 14 one at a time from apparatus 1. Roll the egg 14 on a hard surface (not shown) breaking/cracking the shell all around. Then crack both ends of the egg shell by tapping it also on the hard surface. Eggs 14 can now be easily peeled. After peeling, place each whole egg 14 into a container of ice water 15 (not shown) to stop the cooking process and remove any membrane from the exterior surface of each egg 14. One at a time, remove the eggs 14 from the ice water 15 (not shown) and rinse it under running water 15 (not shown) to remove any residual membranes or pieces of eggshell. Remove apparatus 1 from cooking pot 12, allowing it to dry prior to use in the egg slicing process.

The most preferred method of using the present invention apparatus 1 for slicing eggs 14 involves the following steps. First, dry the eggs 14 to be sliced. One way to do this more efficiently with multiple eggs 14 is to align them into two rows of eggs 14 end-to-end on a towel (not shown), in an end-to-end configuration. Then fold part of the towel over the eggs 14 and roll them back-and-forth within the folded part of the towel to remove excess water from the exterior egg white surface. Once eggs 14 are dry, place up to three vertically oriented eggs 14 each on a different egg seat 17 or 18 (or a combination of egg seats 17 and/or 18 radially aligned with one another for the slicing of two or three eggs 14 at once), preferably with the small end up, and centering each egg 14 to be sliced within its designated seat 17 and/or 18 for optimum alignment with beginning slicing guide slots 6 and finishing slicing guide slots 7 to achieve two cut egg 14 pieces of identical (or nearly identical size) in 1-3 eggs 14 at once. Next take a cutting/slicing tool (not shown) and insert it downwardly into two opposed beginning slicing guide slots 6 aligned with one or more eggs 14. The tool used for egg 14 slicing can be a knife, but other cutting/slicing tools may also be employed. Then, using both hands push or pull a preferred egg 14 slicing tool in a downwardly direction while aligned with the beginning slicing guide slots 6 and finishing slicing guide slots 7 radially aligned with them, until the preferred tool gets to the bottom of each egg 14. Thereafter, prior to removing the tool from beginning slicing guide slots 6 and finishing slicing guide slots 7, preferably move the tool back and forth along the cut line in egg or eggs 14 to make certain that the egg 14 (or eggs 14) have each been cut completely through. Repeat the same cutting procedure for any remaining eggs 14, slicing from one-to-three hard-cooked eggs 14 at a time, according to preference or need. When all eggs 14 needing slicing have been cut into two halves, and use of the cutting/slicing tool and apparatus 1 is complete, the cutting/slicing tool may be removed from apparatus 1. Thereafter, until use during food preparation, hard-cooked egg whites may be stored in a bowl containing ice water 15, and hard-cooked egg yolks in a separate bowl, each under refrigeration until the filling of egg yolk recesses in the hard-cooked egg whites takes place.

While the written description of the invention herein and methods for its manufacture and/or use includes many variations, combinations, and equivalents, and the most preferred embodiment of invention 1 herein is intended to enable one of ordinary skill to make and use its best mode, it should also be appreciated that the invention 1 disclosure herein only provides examples thereof, and specific embodiments also exist which are not specifically mentioned. The present invention 1 should therefore not be considered as limited to the above-described embodiments, methods, and examples, but instead as encompassing all embodiments and methods identified in the accompanying claims, and also within the scope and spirit of invention 1.

We claim:

1. An apparatus used in a cooking pot with a top opening and a domed lid, water, and at least one egg for the purpose of steaming eggs supported by said apparatus until cooked, said apparatus comprising:

a bottom surface having a plurality of lower egg supports, said bottom surface elevated on a plurality of legs, at least two of said lower egg supports are radially aligned with one another and said bottom surface, and said at least two radially aligned lower egg supports each have at least one pair of opposed and aligned finishing slicing guide slots further radially aligned with said bottom surface;

a plurality of perimeter wall sections extending upward from said bottom surface, each said perimeter wall section having a beginning slicing guide slot, at least two of said beginning slicing guide slots are also radially aligned with said bottom surface and each other forming at least one pair of opposed beginning slicing guide slots, said at least one pair of beginning slicing guide slots are also radially aligned with said at least two radially aligned lower egg supports and one said at least one pair of opposed finishing slicing guide slots;

a plurality of upper egg supports, which in combination with said perimeter wall sections form a perimeter surface for said apparatus; and a plurality of steam vent openings in said bottom surface allowing steam circulation and exchange from above and below said bottom surface, wherein when said apparatus is adapted to be placed in the cooking pot through the top opening, the domed lid is adapted to cover the top opening in the pot for capture and circulation of steam around said apparatus and through said steam vent openings, a quantity of the water is adapted to be placed in the pot under said bottom surface of said apparatus, the at least one egg is adapted to be placed upon one of said lower and upper egg supports, and the pot is adapted to be placed upon a hot heating element, steam generated from the quantity of water is adapted to steam the at least one egg until cooked.

2. The apparatus of claim 1 wherein at least two of said radially aligned lower egg supports each have an arcuate egg seat adapted to position the center of the at least one egg placed thereon vertically in radial alignment with one said at least one pair of opposed and aligned finishing slicing guide slots therein.

3. The apparatus of claim 1 wherein said upper egg supports each have an arcuate egg seat adapted to center the at least one egg placed thereon vertically.

4. The apparatus of claim 1 wherein said perimeter wall sections each have a height dimension, and said lower egg supports each are each adapted to position the at least one egg placed thereon below said height dimension of said perimeter wall sections.

5. The apparatus of claim 1 wherein one of said lower egg supports is a center egg support and the remaining ones of said lower egg supports encircle said center egg support, and further wherein said steam vent openings are selected from a group consisting of steam vent slots positioned between adjacent ones of said lower egg supports and steam vent holes encircling said center egg support.

6. The apparatus of claim 1 wherein one of said lower egg supports is a center egg support.

7. The apparatus of claim 6 wherein said center egg support has at least two pairs of said opposed and aligned finishing slicing guide slots.

8. The apparatus of claim 1 wherein said steam vent openings are selected from a group consisting of steam vent slots and steam vent holes.

9. The apparatus of claim 1 further comprising six of said lower egg supports, six of said perimeter wall sections, and six of said legs.

10. The apparatus of claim 9 wherein said bottom surface further comprises a center egg support.

11. The apparatus of claim 10 wherein said center egg support has three pairs of said opposed and aligned finishing slicing guide slots.

12. The apparatus of claim 11 wherein said lower egg supports and said center egg support each have an arcuate egg seat that is adapted to position the center of the at least one egg placed thereon vertically in radial alignment with said opposed finishing slicing guide slots therein.

13. The apparatus of claim 12 wherein said six lower egg supports encircle said center egg support, said steam vent openings are selected from a group consisting of six steam vent slots positioned between adjacent ones of said lower egg supports and twelve steam vent holes encircling said center egg support and also positioned between said center egg support and said lower egg supports.

14. The apparatus of claim 13 wherein said perimeter wall sections each have a height dimension, and said arcuate egg seats of said lower egg supports each are adapted to position the at least one egg placed thereon below said height dimension of said perimeter wall sections.

15. A method using the apparatus of claim 14 for steaming eggs, said method comprising the steps of:
providing said egg steaming apparatus of claim 14, a cooking pot with a top opening and a domed lid sized to cover the top opening, a selected quantity of water, a variable temperature heating element adjustable from settings of high-to-off, a quantity of cold water sufficient to fill the cooking pot twice, a hard surface, a container of ice water, and at least one egg;
placing the selected quantity of water in the cooking pot and associating the cooking pot with the heating element;
centering said egg steaming apparatus in the cooking pot with said legs contacting the cooking pot and the selected quantity of water remaining under said bottom surface;
selecting at least one of said egg seats, and individually and vertically placing the at least one egg on said at least one selected egg seat;
placing the domed lid over the top opening of the cooking pot and adjusting the temperature of the heating element to the highest setting for approximately seven minutes;
decreasing the heating element's temperature setting to the lowest temperature that allows continued boiling of the selected quantity of water in the cooking pot;
after six minutes adjusting the temperature setting of the heating element to off while the cooking pot with said apparatus and the at least one egg remain associated with heating element;
removing the cooking pot with said apparatus and the at least one egg from the heating element after the selected quantity of water in the cooking pot stops boiling;
carrying the cooking pot with said apparatus and the at least one egg to a location near the quantity of cold water sufficient to fill the cooking pot at least twice;
removing the domed lid from the cooking pot and filling the cooking pot with a first portion of the quantity of cold water;
replacing the domed lid and while using the domed lid to retain the cooked eggs within the cooking pot, draining the first portion of the cold water and replacing it with a second portion of the cold water sufficient to fill the cooking pot;
removing the at least one egg now steamed and cooled from the cooking pot and rolling each removed egg on the hard surface, breaking the shell of each removed egg all around; and
peeling each removed egg and placing it into the container of ice water to further stop the cooking process and to loosen any membranes still surrounding the cooked egg white.

16. The method of claim 15 further comprising the steps of removing peeled eggs from the ice water and removing any membrane still attached to the exterior surface of the egg by rinsing it under running water, said steps herein occurring after said step of peeling each removed egg and placing it into the container of ice water.

17. A method slicing at least one membrane-free hard-cooked egg, said method of slicing comprising the steps of:

providing said egg steaming apparatus of claim 10, a cutting tool configured for insertion into said beginning and finishing slicing guide slots, at least one moisture-absorbent towel, and at least one hard-cooked egg;

drying the at least one hard-cooked egg using the at least one absorbent towel;

centering the at least one hard-cooked egg in a vertical position upon said egg seat of a selected one of said egg supports having two opposed finishing slicing guide slots radially aligned with the hard-cooked egg center and with two opposed beginning slicing guide slots in two opposed sections of said perimeter wall;

inserting the cutting tool into said beginning slicing guide slots aligned with the egg center;

forcing the cutting tool downwardly through said two beginning slicing guide slots, the hard-cooked egg, and said radially aligned finishing slicing guide slots until the cutting tool reaches to the bottom of the hard-cooked egg, separating the hard-cooked egg into two halves.

18. The method of claim 17 further comprising the step of moving the cutting tool back and forth in said finishing slicing guide slots of said selected lower egg support under the hard-cooked egg prior to removing the cutting tool from the two opposed beginning slicing guide slots into which it was inserted for egg-cutting purposes, said step of moving the cutting tool back and forth occurring after said step of forcing the cutting tool downwardly and finishing the separation of the hard-cooked egg into two halves.

19. The method of claim 17 allowing the slicing of three eggs at a time and further comprising the step of placing two hard-cooked eggs each on a different one of said lower egg supports radially aligned with one another, the step of placing a third hard-cooked egg on the center egg support radially aligned with the two lower egg supports, and wherein said step of forcing the cutting tool downwardly causes the cutting tool to reach the bottom of all three hard-cooked eggs, separating all three hard-cooked egg into two halves.

20. The method of claim 17 wherein said step of drying eggs includes:

selecting at least two hard-cooked eggs;

aligning the selected at least two hard-cooked eggs into two adjacent rows of selected eggs placed in an end-to-end configuration on the at least one moisture-absorbent towel;

folding part of the at least one moisture-absorbent towel over the selected hard-cooked eggs; and rolling the selected hard-cooked eggs back-and-forth within the folded part of the at least one moisture-absorbent towel, removing excess water from the exterior surfaces of all selected hard-cooked eggs.

* * * * *